UNITED STATES PATENT OFFICE.

GUSTAV BARTEL, OF NEW YORK, N. Y.

PREPARING PULP FROM PUMPKINS.

SPECIFICATION forming part of Letters Patent No. 436,686, dated September 16, 1890.

Application filed April 25, 1890. Serial No. 349,527. (No specimens.)

*To all whom it may concern:*

Be it known that I, GUSTAV BARTEL, a citizen of the United States, residing at New York, in the county and State of New York, have invented new and useful Improvements in Preparations of Pulp from Pumpkins and Squashes, of which the following is a specification.

This invention relates to certain improvements in the preparation of a pulp from pumpkins or squashes suitable for marmalades, as pointed out in the following specification and claim.

In carrying out my invention I take pumpkins or squashes, open and peel them, and remove the seeds and all other parts which are of no use in the subsequent preparation of marmalade. The purified flesh of the fruit thus obtained is then cut up into small cubes and placed into a vessel with a sufficient quantity of water to cover the fruit. To this water I add a small quantity of borax—about one ounce to five pounds of the purified fruit—and then I heat the vessel until the water boils. By the action of the borax the peculiar unpleasant taste of the pumpkin or squash is extracted, and after the boiling has been continued for some time—say ten minutes—I separate the pulp from the liquid, which can be done by pouring the contents of the vessel upon a suitable filter. The pulp obtained in this manner is free from the peculiar unpleasant taste of a pumpkin or squash, while the same retains all its nutritious qualities, so that it can be used with great advantage for the preparation of marmalades of various kinds.

What I claim as new, and desire to secure by Letters Patent, is—

The process herein described of preparing pulp from pumpkins or squashes, which consists in subjecting the cut material to the action of a hot aqueous solution of borax and subsequently draining the liquid from the pulp, substantially as set forth.

In testimony whereof I have hereunto set my hand in the presence of two subscribing witnesses.

GUSTAV BARTEL.

Witnesses:
   WM. C. HAUFF,
   E. F. KASTENHUBER.